United States Patent [19]

Rubincam

[11] 4,159,417
[45] Jun. 26, 1979

[54] ELECTRONIC BOOK

[76] Inventor: David P. Rubincam, 6303 20th Ave., West Hyattsville, Md. 20782

[21] Appl. No.: 846,554

[22] Filed: Oct. 28, 1977

[51] Int. Cl.² .................. G06F 15/20; G06K 7/12; G08B 5/00; G02B 27/00
[52] U.S. Cl. .................... 235/375; 235/457; 340/366 R; 350/3.75; 365/216; 353/27 R
[58] Field of Search ............... 235/457, 454; 360/216, 360/94, 108; 340/366 R, 366 A, 366 B; 350/3.69, 3.71, DIG. 1, 3.75; 250/329; 353/68, 71, 26 R, 27 R; 365/94, 216

[56] References Cited

U.S. PATENT DOCUMENTS 3,290,987  12/1966  James et al. ............................ 353/26
3,669,521  6/1972  Tait ....................................... 365/216

Primary Examiner—Daryl W. Cook
Attorney, Agent, or Firm—Donald A. Kettlestrings

[57] ABSTRACT

The contents of a book, magazine or the like are digitally encoded onto a memory, and the memory is removably insertable into a portable book-like apparatus whereby the encoded information can be displayed on a screen of the apparatus.

14 Claims, 10 Drawing Figures

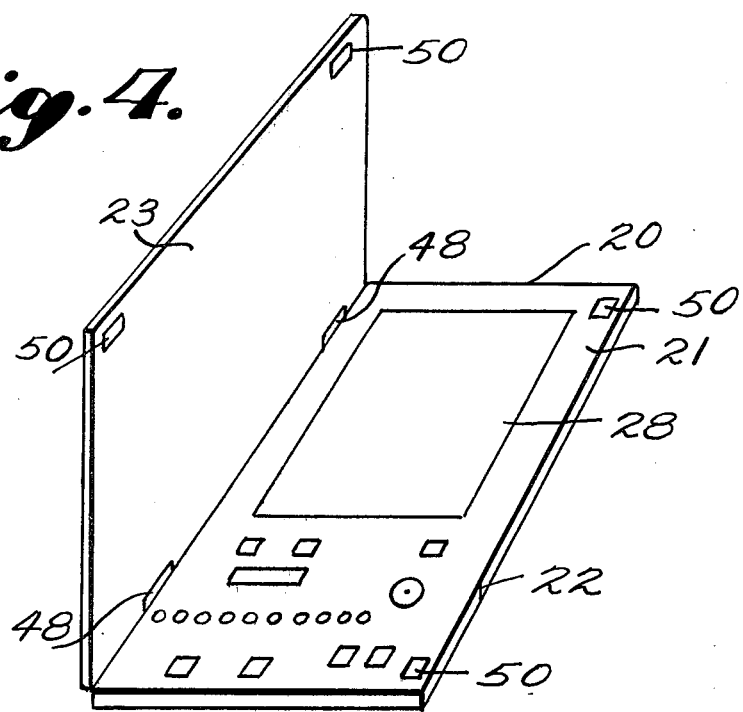
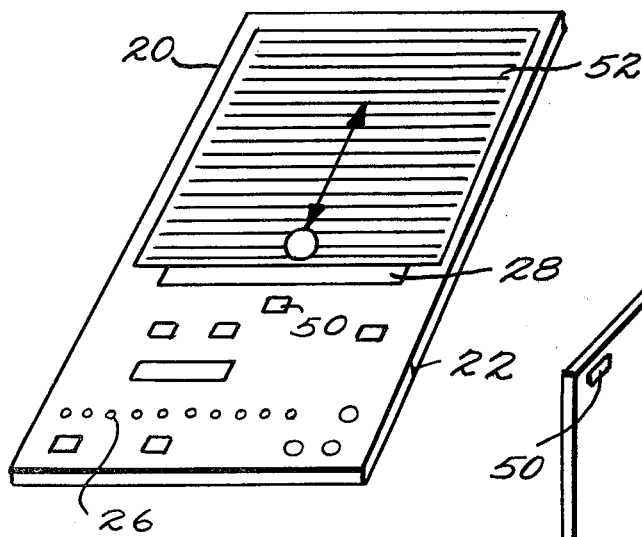
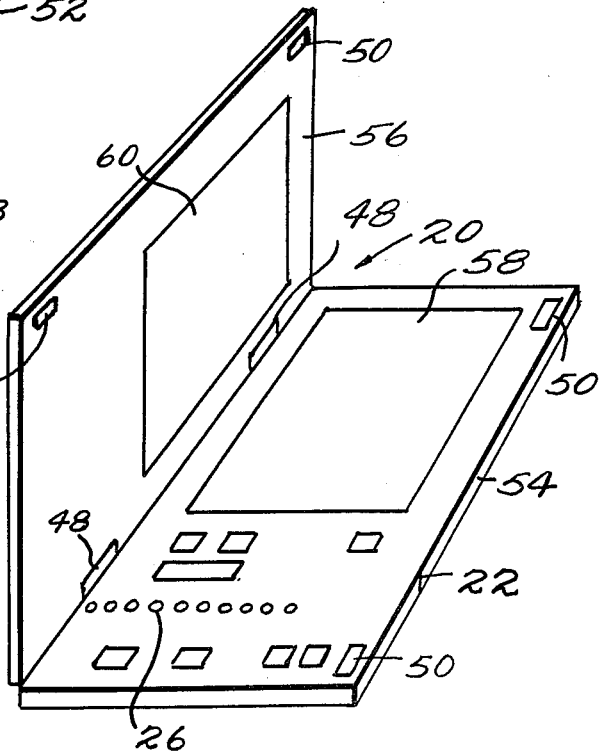

ELECTRONIC BOOK

This invention relates to information storage and display apparatus and more particularly to a portable, electronic viewer which reads stored miniaturized and encoded information and displays the information on a thin electrical display screen.

In recent years there has been a great increase in the number of books and magazines and the increased use of computers has resulted in the production of a large volume of computer printouts. This explosion in the production of information and paper has created problems for libraries that do not have sufficient space for storage of these materials. In addition, books are becoming increasingly expensive, and even paperback books are no longer inexpensive.

It is, therefore, an object of the present invention to provide a portable, electronic viewing device to replace presently existing books, magazines, microfilm, computer printouts and other printed media.

Another object is to provide a portable, electronic viewer which reads stored minaturized and encoded information and which displays the information in readable form on a thin electrical display screen.

A further object of the invention is the provision of a portable, electronic viewer capable of receiving and displaying the contents of a digital memory.

Still another object is to provide a portable, electronic viewer which opens and closes in a manner similar to that of a book.

Yet another object of the present invention is the provision of a portable, electronic viewer which enables the operator to electronically "turn pages" of a book, the information from which is digitally stored in a memory.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects, the present invention provides for apparatus having a digital memory, a sensor for sensing information from the memory, logic circuitry operatively coupled with the sensor, and a display in operative relationship with the logic circuitry for visually displaying information stored in the memory. The improvement of this invention provides for a portable container to house the memory, sensor, logic circuitry and display and defining an opening for receiving the digital memory. Control means are also located on the exterior of the container and in operative relationship with the logic circuitry for enabling an operator of the apparatus to control the information displayed.

Preferably, the opening in the container for receiving the digital memory is positioned to enable insertion of the memory into operative relationship with the sensor and to enable removal of the memory from the container.

It is to be understood that both the foregoing general description and the following detailed description are exemplary and explanatory, but are not restrictive of the invention.

The accompanying drawings, which are incorporated in and constitute a part of the specification, illustrate an example of a preferred embodiment of the invention and together with the description, serve to explain the principles of the invention.

In the drawings:

FIG. 4 is a perspective view of another invention embodiment;

FIG. 5 is a perspective view of an additional embodiment of the invention;

FIG. 6 is a perspective view of still another invention embodiment;

Figure 1:
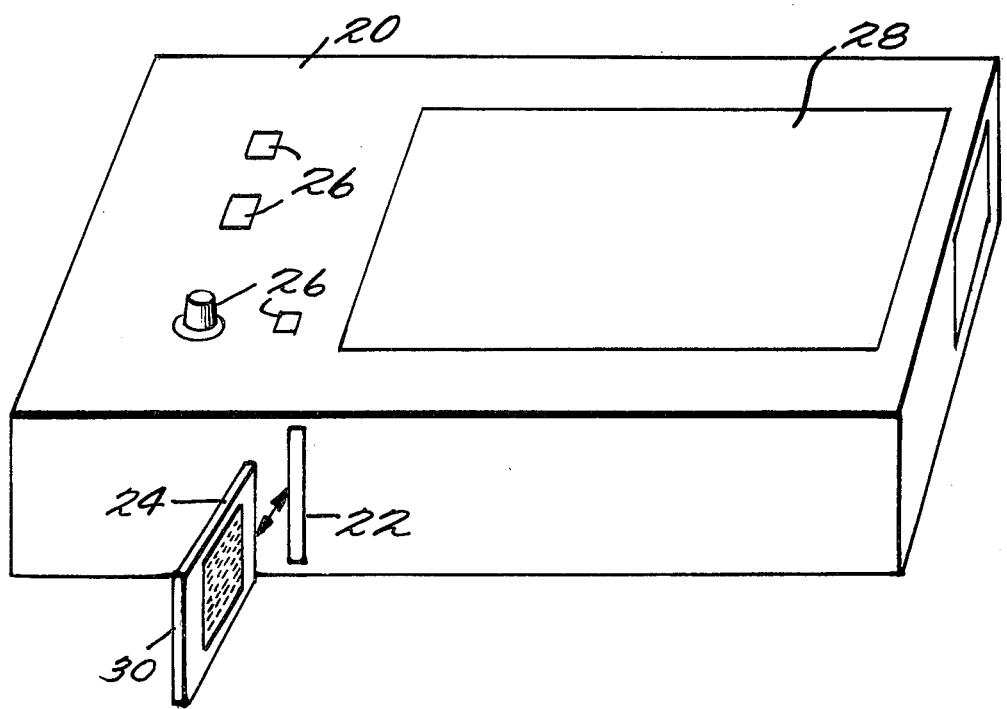
FIG. 1 is a perspective view of one embodiment of the invention.

With reference now to the drawings, wherein like reference characters designate like or corresponding parts throughout the several views, there is shown in FIG. 1 an example of a preferred embodiment of the invention. A portable container 20 is provided, and the container defines an opening 22 for receiving a digital memory 24. Control means 26 are provided, and a display or screen 28 is provided for ultimately displaying to the operator in readable form the information encoded in miniaturized form on digital memory 24. Preferably, container 20 is approximately the same size and shape as an open book and it is just as convenient to carry and to use.

Figure 2:
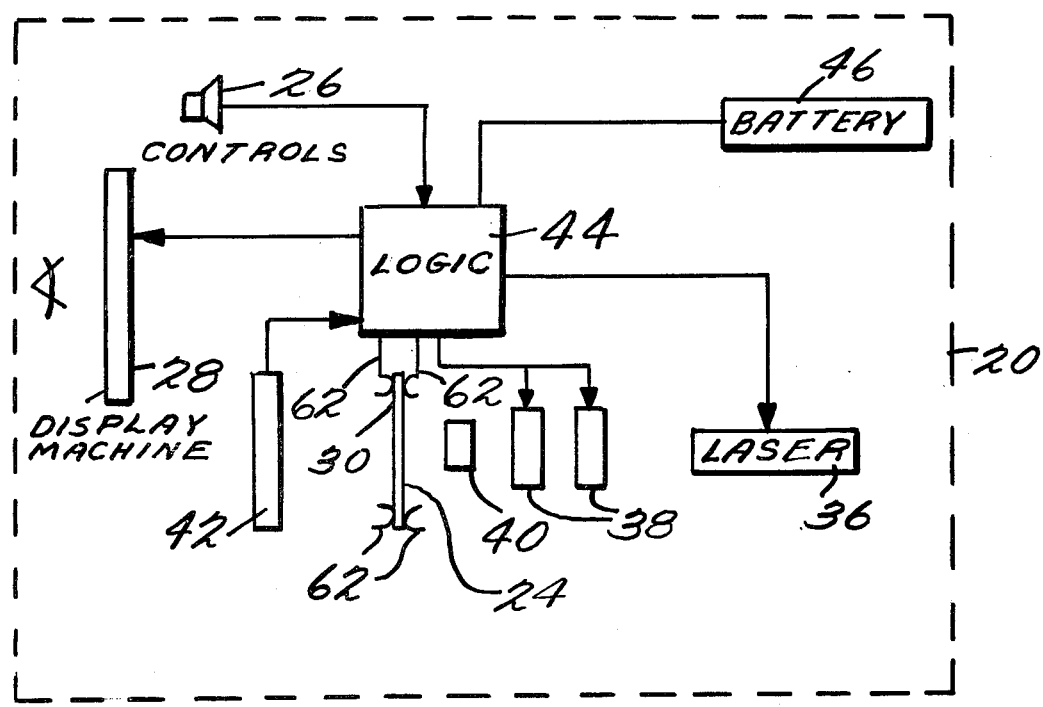
FIG. 2 is a block diagram of the invention.

With reference now to FIG. 2, the components located within container 20 are illustrated. Although the specific embodiment described is a holographic memory system, it should be understood that this invention also contemplates the use of other digital, nonvolatile memories. For example, the memory might be microfilm consisting of black and white dots, or bits mounted on a rigid card or disc. The memory might also be a magnetic bubble, optical or electronic card or disc. However, the preferred embodiment of the invention contemplates use of a holographic card 30 of rigid plastic or other material.

Figure 3:
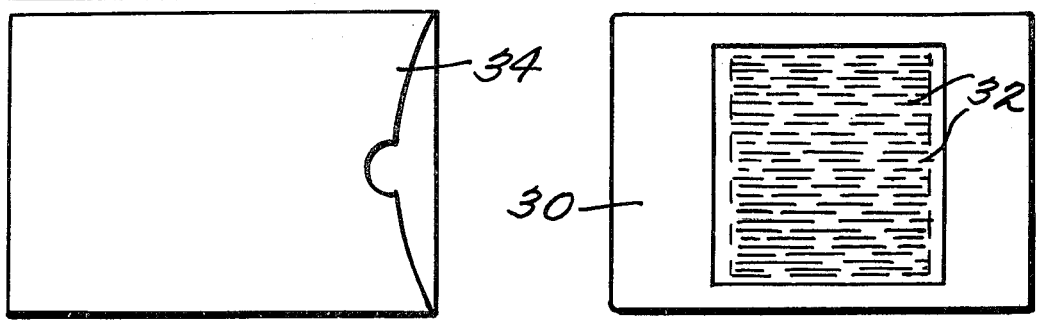
FIG. 3 illustrates one form of digital memory to be used with the invention.

A hologram or holographic card 30 is illustrated in FIG. 3, and similar holographic memories are described in the following references which are incorporated herein by reference; Anderson, L. K., "Optical Memory for Bulk Data Storage", Bell Laboratories Record, Vol. 46, pp. 318-325, November, 1968; "Data Terminal Features Holographic Memory with up to 200 Mbits", Computer, Vol. 10, No. 1, p. 72, January 1977; and Middelhoek, S., P. I. George, and P. Dekker, "Physics of Computer Memory Devices", Academic Press, New York, pp. 333-367, 1976. The hologram may typically comprise a photographic film mounted in a plastic card.

Preferably, card 30 includes a plurality of holograms 32, each hologram being approximately 1 millimeter in diameter and containing about 10,000 bits of information. The holograms may be "page-oriented" so that each hologram represents a page of the book or other written materials stored by memory 24. Each card 30 may contain several hundred pages of information so that an entire book can be stored on the card, and the card may be kept in case 34 for protection when the card is not in Holograms appear to be the ideal way to miniaturize printed matter, and the storage capacity of a holographic card 30 is sufficient to contain all of the words in a typically long novel. For example, if such a novel is considered to contain $10^5$ words, if the average word length in the English language is six letters, and if each character or letter may be encoded with seven bits, the novel contains $10^5 \times 6 \times 7 = 4.2$ million bits. Further, a typical page of a book has approximately 250 words, which is $250 \times 6 \times 7 = 10,500$ bits, or about the same as a typical page-oriented hologram. Assuming a $10^4$ bit page, 420 page holograms are required and this is approximately a 21 by 21 matrix. Since each hologram is approximately 1 millimeter square, an area of approximately 2.1 centimeters by 2.1 centimeters is required for the entire novel. This is less than 1 square inch, and a credit card size holographic card could easily house such a novel.

In addition, holographic cards are permanent, highly resistent to bit loss from dust or scratches and are easily reproduced. Holographic storage of information is also inexpensive, and at about $10^6$ bits per penny, holographic books are much cheaper than paper books.

Ordinary film may be used as the holographic medium, or other materials such as thermoplastic may also be used. See Bartolini, R. B., H. A. Weakleim, and B. F. Williams, "Review and Analysis of Optical Recording Media", Optical Engineering, Vol. 15, pp. 99–108, March-April 1976, which is incorporated herein by reference. Further, a hologram cassette (not shown) could be used in place of card 30 so as to greatly increase the storage capacity. See Knight, G. R., "Holographic Memories", Optical Engineering, Vol, 14, pp. 455–459, September-October 1975 and Ih, C. S., "Sequential Information Retrieval from Holograms", Applied Optics, Vol, 15, No. 11, pp. 2698–2700, November 1976 which are incorporated herein by reference.

The holographic system as employed in this invention is shown in block diagram form in FIG. 2. A laser 36 is preferably a small, low power, long-lived, solid-state laser such as a gallium arsenide laser. Such lasers are described by Panish, M., and I. Hayashi, "A New Class of Diode Lasers", Scientific American, Vol. 225, No. 1, pp. 32–40, July 1971, which is incorporated herein by reference. A small gas laser could also be used.

Deflectors 38 are provided for directing the laser beam through a predetermined portion of card 30. Deflectors 38 are preferably acousto-optic or electro-optic deflectors. Such deflectors are described by Anderson, L. K., "Optical Memory for Bulk Data Storage", Bell Laboratories Record, Vol. 46, pp. 318–325, November, 1968 and Middelhoek, S., P. K. George, and P. Dekker, "Physics of Computer Memory Devices", Academic Press, New York, pp. 333–367, 1976. Additional optical components or lenses 40 are also provided in a conventional manner.

Detector matrix 42 is a well-known component and preferably comprises silicon diodes. See Anderson, L, K., "Optical Memory for Bulk Data Storage", Bell Laboratories Record, Vol. 46, pp. 318–325, November, 1968; Kiemle, H., "Considerations on Holographic Memories in the Gigabyte Region", Applied Optics, Vol, 13, pp. 803–807, April 1974; Duncan, F. W., "Special Report on Silicon Photodiodes", Optical Spectra, Vol, 9, pp. 26–28, February 1975, and Wendland, P. H., "Silicon Photodiodes Come into their Own", Optical Spectra, Vol. 7, pp. 33–36, October 1973, which are incorporated herein by reference.

Logic circuitry 44 preferably comprises integrated circuits on a silicon chip, as is standard for pocket calculators. See McWhorter, E. W., "The Small Electronic Calculator", Scientific American, Vol. 234, No. 3, pp. 88–98, March 1976, which is incorporated herein by reference.

Display screen 28 can be any one of a number of typical thin, electronic display screens which display characters comprised of dots or strokes. See Kuntz, R., "The Display Bank", Optical Spectra, Vol. 9, pp. 39–44, September 1975 and Sobel, A., "Electronic Numbers", Scientific American, Vol. 228, No. 6, pp. 64–73, June 1973, which are incorporated herein by reference. The use of a liquid crystal display screen is preferable because it is easy to read and is not fatiguing to the eyes. See Astle, B., "Liquid Crystals—A Viable New Medium", Optical Spectra, Vol. 7, pp. 35–40, July 1973 and Heilmeier, G. H., "Liquid Crystal Display Devices", Scientific American, Vol. 222, No. 4, pp. 100–106, April 1970, which are incorporated herein by reference.

The system can be powered by standard commercial batteries 46 or a detachable or retractable electric cord (not shown) may be provided for access to conventional electrical outlets.

An alternative embodiment of the invention is illustrated in FIG. 4 wherein book-sized container 20 is provided with controls 26, a display screen 28 and opening 22 for receiving the digital memory. Container 20 includes a first section 21 and a second section or cover 23 connected to each other in the manner of a book by hinges 48. In addition, Velcro patches or other holding means 50 are provided for holding the first and second sections of the container together when the sections are in a closed position.

Another embodiment of the invention is illustrated in FIG. 5 wherein display screen 28 is protected when the apparatus is not in use by means of a retractable shutter 52. Shutter 52 can be fastened in position for covering the screen by means of Velcro patches or holding means 50, and the shutter can be retracted by means of a roller (not shown) in the manner of a window shade. The shutter may be composed of a single piece of flexible material or it may be composed of a plurality of slats.

Still another embodiment of the invention is illustrated in FIG. 6 wherein container 20 includes a first section 54 and a second section 56 connected together by means of hinges 48. In this embodiment, the display or screen 28 is also divided into a first section 58 and a second section 60. First section 58 of the screen is located within first section 54 of the container and second section 60 of the screen is located within second section 56 of the container so as to provide two opposing areas or "pages" for the reader in a manner similar to a book or magazine. In addition, Velcro patches or holding means 50 are provided for holding sections 54 and 56 in a closed position when the apparatus is not in use.

Opening 22 of container 20 is positioned in each of the embodiments to enable insertion of digital memory 24 or holographic card 30 into operative relationship with sensor or detector matrix 42. Retaining means or holders 62 (FIG. 2) are provided for enabling the memory to be inserted into the proper position within the apparatus and also for enabling easy withdrawal of the memory from the apparatus by the operator.

Figure 7:
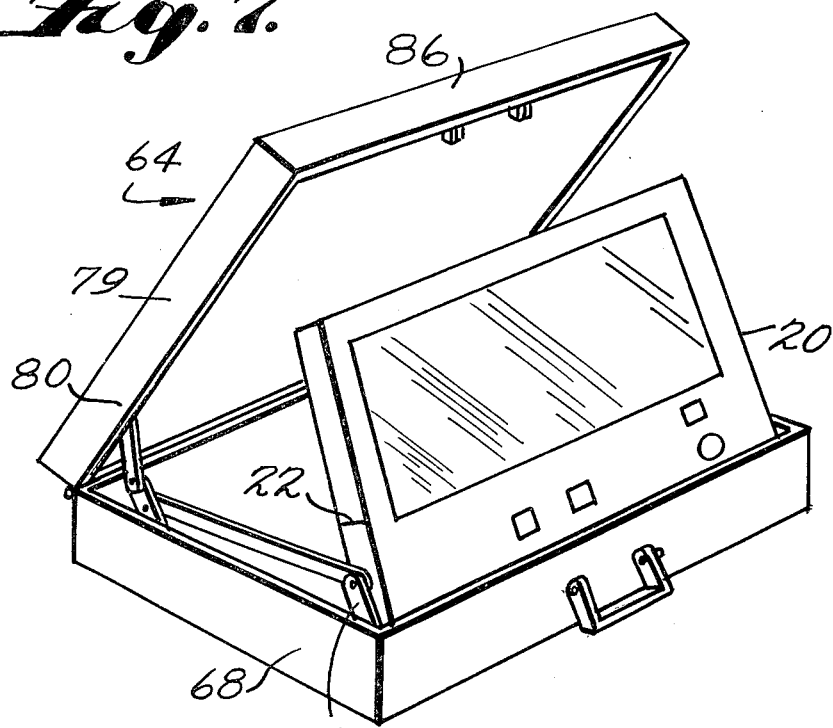
FIG. 7 is a perspective view of another invention embodiment.
Figure 7A:
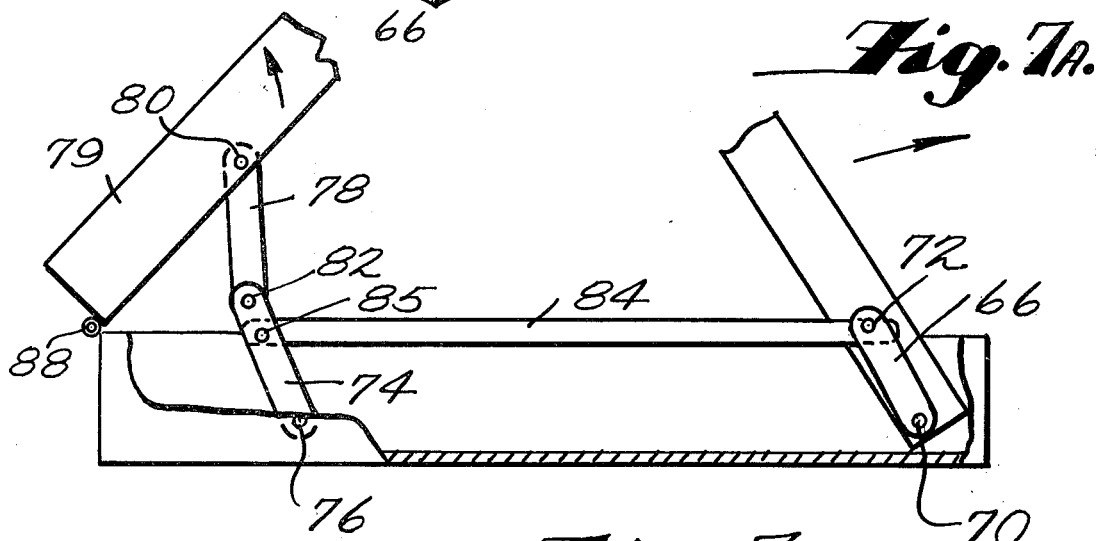
FIGS. 7A and 7B are detailed fragmentary views of the embodiment shown in FIG. 7.
Figure 7B:
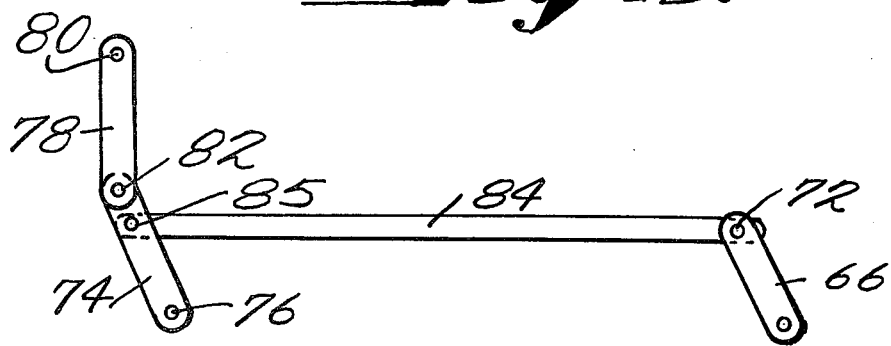

Another embodiment of the invention is illustrated in FIGS. 7, 7A and 7B. In this embodiment container 20 is pivotally mounted inside a briefcase 64. Arm means or lever arm 66 is pivotally attached to wall 68 of briefcase 64 at pivot point 70. The other end of lever arm 66 is pivotally attached to container 20 at pivot point 72.

A second lever arm 74 of a length longer than that of lever arm 66 is pivotally attached to wall 68 at pivot point 76. A third lever arm 78 is pivotally attached to wall 79 of briefcase 64 at pivot point 80.

Lever arms 74 and 78 are also pivotally connected to each other at pivot point 82, and a fourth lever arm 84 is pivotally connected at one end to lever arm 74 at pivot point 85 and at the other end to lever arm 66 at pivot point 72. The same arrangement of lever arms (not shown) can be provided on the opposite side of container 20.

In operation of the apparatus illustrated in FIGS. 7, 7A and 7B, the pivoting action of the arm means or lever arms, acting in cooperation with the briefcase and with container 20, causes container 20 to move into a substantially upright position when the top portion or cover 86 of the briefcase is rotated into an open position. Conversely, when the top portion of the briefcase is rotated about hinges 88 and into a closed position, container 20 is also caused to rotate into a position within the briefcase.

In operation of the apparatus, the contents of one or more books, magazines or the like are stored in digital memory 24 or holographic card 30. When it is desired to retrieve the information or to read the book or magazine, the operator merely removes the memory or card from its case 34 and inserts the card into opening 22 of container 20. Card 30 is then automatically positioned between matrix 42 and deflectors 38. Light from laser 36 shines on the hologram page desired, and an image of binary bits falls on photo detector matrix 42. The bits are decoded into characters by logic circuitry 44 and are displayed on screen 28.

Control means 26 allow the operator to control positioning of the laser beam with respect to the holographic card so as to enable quick and accurate access by the operator to the information desired. Logic circuitry 44 is electrically coupled with control means 26 for interpreting and carrying out the commands.

Figure 8:
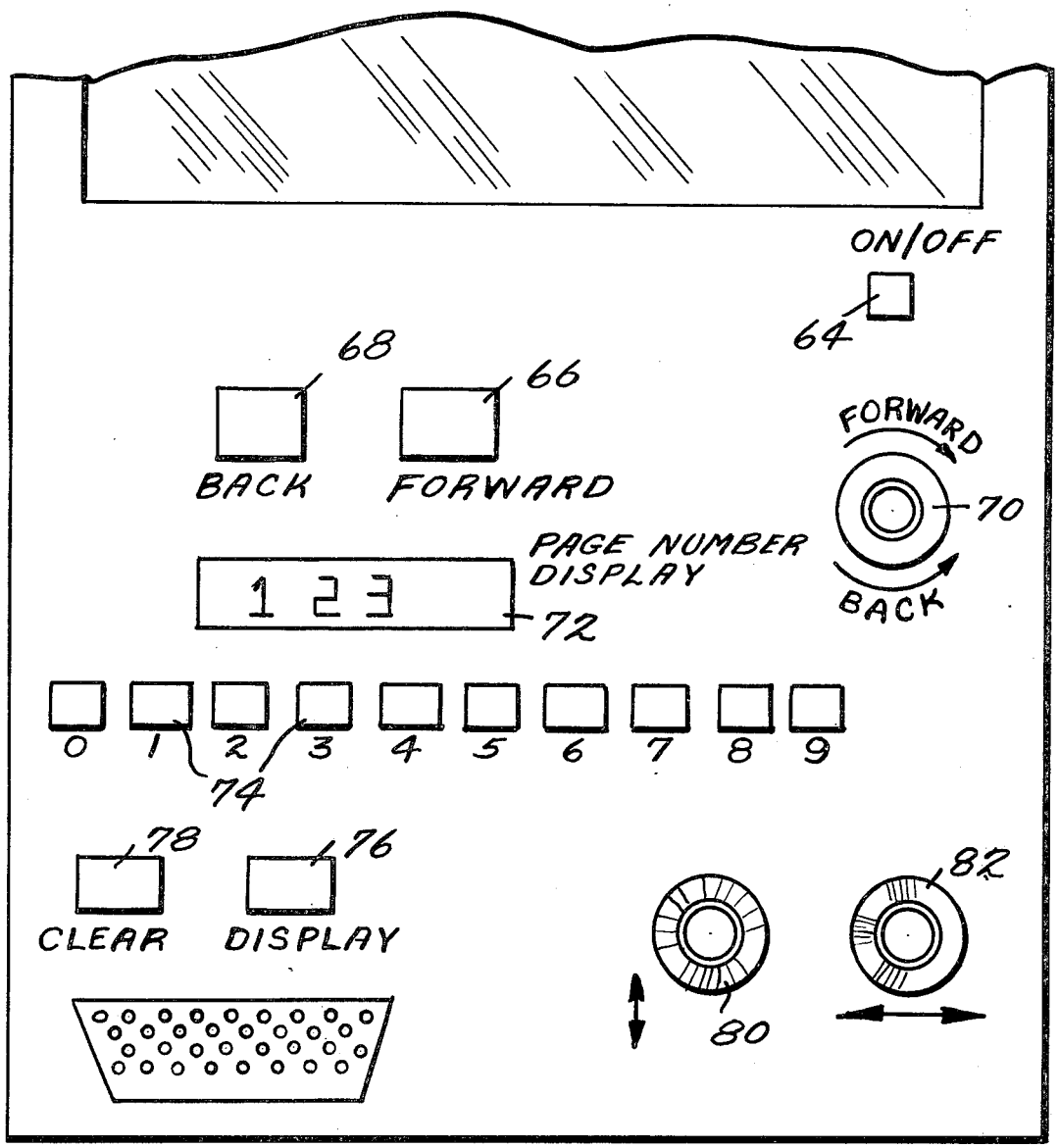
FIG. 8 is a fragmentary plan view of the controls of an embodiment of the invention.

With reference now to FIG. 8 there is shown an example of the types of controls provided. Specifically, the on/off button or switch 64 energizes or deenergizes the holographic or other memory storage system. The "forward" switch 66 advances the page so that the succeeding page of information stored in the memory is displayed on screen 28. The "back" switch 68 moves the page backwards to the preceeding page for display on the screen. A variable speed page turner switch 70 enables the operator to rapidly turn forward or backward through the recorded information at variable speeds. In addition, a small secondary display screen 72 may be provided for displaying the page number of the information being displayed on screen 28. If a specific page of the stored information is desired to be displayed, the page number is entered by using the ten buttons 74. If the "display" button 76 is then depressed, that page number is displayed on secondary display 72 and the information on the page is simultaneously displayed on screen 28. If a mistake is made in entering the page number, depression of the "clear" button 78 clears page number display 72.

Dials 80 and 82 marked with vertical and horizontal arrows are provided for fine-tuning deflectors 38 in the event that the laser beam is not centered properly on the hologram. Alternatively, dials 80 and 82 could be replaced with a mechanism to properly position the image of the hologram on the detector matrix 42.

The container may be made of plastic, metal, wood or other material. The container may also have a carrying handle (not shown) for ease of transport and the container and texture may be such that the device is easily gripped and carried.

Display or screen 28 may be planar or slightly curved, whether the screen is of a one or two-piece configuration. The curved configuration may act to reduce glare. Legs (not shown) may also be attached to the container so that the apparatus may be tilted to a desired position when placed on a flat surface. The legs may be retractable or folding to keep them out of the way.

This invention provides for a portable, electronic viewer that will enable large masses of printed material to be reduced in size for storage. This will significantly reduce the crowding now being experienced by libraries and other facilities which are faced with the task of storing the vast amounts of books and papers being generated. The apparatus is rugged, compact, portable and easy to use. It avoids the difficulties experienced by microfilm viewers of being bulky and of requiring tedious threading of film. The memory of this apparatus is easily inserted and removed and there is no requirement for threading of film. In addition, sharp resolution of alphanumeric characters via complicated optics is avoided because of the digital logic utilized by the apparatus.

The memory used with the apparatus of this invention is small, light in weight and packed with information. The invention eliminates the need for carrying heavy books and saves enormous amounts of space. The invention will significantly reduce mailing costs and should greatly reduce the cost of books and other media.

The invention in its broader aspects is not limited to the specific details shown and described, and departures may be made from such details without departing from the principles of the invention and without sacrificing its chief advantages.

What we claimed is:

1. In apparatus including a digital memory, a sensor for sensing information from the memory, logic circuitry operatively coupled with the sensor, and a display in operative relationship with the logic circuitry for visually displaying information stored in the memory, the improvement comprising:
    a portable container containing said memory, sensor, logic circuitry and display and defining an opening for receiving said digital memory; and
    control means in operative relationship with said logic circuitry for enabling an operator of the apparatus to control the information displayed;
    said memory including a substantially rigid card containing a matrix of holograms and wherein said holograms contain binary bits of information.

2. Apparatus as in claim 1 wherein said binary bits include encoded character information which is displayed as words on said display.

3. Apparatus as in claim 2 wherein the entire contents of a book are encoded on said card.

4. Apparatus as in claim 3 wherein said display includes liquid crystal means in operative relationship with logic circuitry for displaying said information.

5. Apparatus as in claim 4 wherein said container includes first and second sections hingedly connected to each other in the manner of a book.

6. Apparatus as in claim 5 wherein said display includes first and second sections, the first section of said display being positioned in said first container section and the second section of said display being positioned in said second container section.

7. Apparatus as in claim 6 further including means in operative relationship with said first and second container sections for holding said sections in a closed position.

8. Apparatus as in claim 4 further including a cover member hingedly connected to said container for covering said display when the cover is in a closed position and the apparatus is not in use.

9. Apparatus as in claim 4 further including cover means for covering and protecting said display when the apparatus is not in use.

10. Apparatus as in claim 4 further including:
an additional container defining a base and a cover and holding said portable container; and
arm means in operative relationship with said container for enabling said portable container to move into a substantially upright position from a substantially horizontal position when the cover of said additional container is opened.

11. Apparatus as in claim 10 wherein said arm means include:
a first arm member pivotally connected at one end thereof to said base and pivotally connected at the other end thereof to said portable container;
a second arm member pivotally connected at a first end thereof to said base;
a third arm member pivotally connected at a first end thereof to said cover and pivotally connected at a second end thereof to a second end of said second arm member; and
a fourth arm member pivotally connected at a first end thereof to said first arm member and at a second end thereof to said second arm member.

12. Apparatus as in claim 11 wherein said first arm member is shorter than said second arm member.

13. In apparatus including a digital memory for storing readable information in digitally encoded form, a sensor for sensing information from the memory, logic circuitry operatively coupled with the sensor for decoding the digitally encoded information into readable information, and a display in operative relationship with the logic circuitry for visually displaying the readable information, the improvement comprising:
a portable container containing said memory, sensor, logic circuitry and display and defining an opening for receiving said digital memory; and
control means in operative relationship with said logic circuitry for enabling an operator of the apparatus to control the information displayed.

14. Apparatus as in claim 13 wherein said opening is positioned to enable insertion of said memory into operative relationship with said sensor and to enable removal of said memory from said container.

* * * * *